United States Patent [19]

Iimura et al.

[11] Patent Number: 5,184,237
[45] Date of Patent: Feb. 2, 1993

[54] SUPER-TWISTED NEMATIC TYPE LIQUID CRYSTAL DISPLAY DEVICE

[75] Inventors: Haruo Iimura, Yokohama; Yasuyuki Takiguchi, Kawasaki; Akihiko Kanemoto, Yokohama, all of Japan

[73] Assignee: Ricoh Company, Ltd., Tokyo, Japan

[21] Appl. No.: 669,576

[22] Filed: Mar. 14, 1991

[30] Foreign Application Priority Data

Mar. 27, 1990 [JP] Japan .................. 2-77393
Mar. 27, 1990 [JP] Japan .................. 2-77394

[51] Int. Cl.$^5$ .................. G02F 1/1335; G02F 1/135; G02F 1/1333
[52] U.S. Cl. .................. 359/63; 359/72; 359/82
[58] Field of Search .................. 350/347 R; 359/72, 63, 359/82

[56] References Cited

U.S. PATENT DOCUMENTS

| | | | |
|---|---|---|---|
| 4,080,046 | 3/1978 | Nishizaki | 350/347 R |
| 4,385,806 | 5/1983 | Fergason | 359/73 |
| 4,443,065 | 4/1984 | Funada et al. | 359/93 |
| 4,466,702 | 8/1984 | Wiener-Avncar et al. | 350/347 R |
| 4,533,214 | 8/1985 | Penz et al. | 350/337 |
| 4,701,028 | 10/1987 | Clerc et al. | 350/347 E |
| 4,844,569 | 7/1989 | Wada et al. | 350/347 E |
| 4,904,058 | 2/1990 | Kato et al. | 359/53 |
| 4,909,606 | 3/1990 | Wada et al. | 350/347 E |
| 4,936,654 | 6/1990 | Suzaki et al. | 350/347 E |
| 4,957,349 | 9/1990 | Clerc et al. | 350/347 R |
| 4,973,137 | 11/1990 | Kozaki et al. | 350/347 R |
| 4,984,873 | 1/1991 | Takiguchi et al. | 350/337 |
| 4,995,704 | 2/1991 | Yamamoto et al. | 350/347 R |
| 5,016,988 | 5/1991 | Iimura | 350/347 R |
| 5,039,185 | 8/1991 | Uchida et al. | 359/93 |

FOREIGN PATENT DOCUMENTS

| | | | |
|---|---|---|---|
| 0284372 | 9/1988 | European Pat. Off. | 350/347 R |
| 0311405 | 4/1989 | European Pat. Off. | 350/347 R |
| 0312297 | 4/1989 | European Pat. Off. | 350/347 R |
| 0341702 | 11/1989 | European Pat. Off. | 350/347 R |
| 0128319 | 8/1982 | Japan | 350/345 |
| 0159117 | 7/1987 | Japan | 350/347 R |
| 0210934 | 8/1989 | Japan | 350/347 R |
| 0217315 | 8/1989 | Japan | 350/347 R |
| 1462978 | 1/1977 | United Kingdom | 350/347 R |

OTHER PUBLICATIONS

Iimura et al.—"STN-LCD With Improved Viewing Angle Characteristics Using A Birefringent Film" SID 89 Digest—vol. XX—May 1989—pp. 398–401.

Primary Examiner—William L. Sikes
Assistant Examiner—Anita Pellman Gross
Attorney, Agent, or Firm—Oblon, Spivak, McClelland, Maier & Neustadt

[57] ABSTRACT

A liquid crystal cell display device including a liquid crystal cell comprising a pair of substrates having transparent electrodes and aligning films, a liquid crystal composition with a positive dielectric anisotropy positioned between the substrates, major axes of the liquid crystal molecules being aligned nearly parallel in a plane parallel to the substrate when a field is applied and the liquid crystal molecules being twisted in an angle of 120° to 360° in a direction perpendicular to the substrate; a pair of polarizers positioned on opposite sides of the cell; and one or more birefringent layers positioned between the cell and at least one of the polarizers in which a maximum refractive index directions at a planes contacting the polarizer and the liquid crystal cell, are tilted with respect to a plane parallel to the substrate, angles made between each of the directions and the parallel plane are symmetrical one another with regard to a plane parallel to the substrate when angles made between the substrate and maximum refractive index directions positioned between the contacting planes of the birefringent layers are continuously distributed.

15 Claims, 4 Drawing Sheets

SUPER-TWISTED NEMATIC TYPE LIQUID CRYSTAL DISPLAY DEVICE

BACKGROUND OF THE INVENTION

The present invention relates to an improvement in an STN (Super-Twisted Nematic) type liquid crystal display device which has liquid crystal molecules having a positive dielectric anisotropy that are twisted at least 90 degrees in a perpendicular direction to a display surface of the device.

A mode of display of a liquid crystal (hereinafter referred to as "L.C.") currently in use is the Twisted Nematic (hereinafter referred to as "TN") type which has L.C. molecules twisted about 90 degrees between a pair of polarizers and utilizes rotation of the polarization surface by the L.C. and a compensation of the rotation induced by a voltage. Although this mode can be applied to an instrument requiring only a low multiplexing drive, such as a watch and a portable electronic calculator, when it is applied to an instrument of a highly multiplexing drive in order to increase display capacity, disadvantages occur. The contrast is reduced and the display viewing angle is narrowed. These disadvantages occur because the ratio of working voltages on a selective point and a nonselective point approach 1.

To avoid these disadvantages, it is preferable to make a steepness, $\gamma$, as small as possible. The steepness, $\gamma$, is defined by the equation:

$$\gamma = V_{50}/V_{10}$$

wherein $V_{10}$ represents a voltage difference with which a relative transmittance of the display changes 10% and $V_{50}$ represents the same voltage except that the change is 50% instead of 10%.

The steepness of the TN type display is around 1.13. On the other hand, a display of STN or SBE (Super-Twisted Birefringence Effect) mode can make the steepness lower than 1.1 by making a twisted angle of L.C. molecule large and shifting polarizing axis from an aligned direction of L.C. molecules. As a result, it is possible to obtain a display of a highly multiplexing drive having a duty of around 1/400.

However, in these cases, a display surface gets colored when a field is applied because of existence of birefringence. Since it is necessary to utilize changes of the color according to the field strength for the display, there exists the disadvantage of poor contrast because a black and white display is very difficult in principle.

Japanese Patent Application, Laid-Open (KOKAI) 64-519 (1989) discloses a method to use a birefringent medium as a color compensation plate in order to avoid the disadvantages of STN type L.C. display device caused by the coloring. However, this method has another disadvantage, brightness and a color on display surface change according to a viewing direction.

The present inventors have studied extensively aiming to reduce disadvantages of the conventional STN type L.C. display device and to provide L.C. display device having high contrast throughout a wide range of viewing angle. Finally, they have found that by designing a L.C. display device comprising the following features, several advantages are realized:

A liquid crystal cell of the invention comprises:
(a) a pair of substrates having transparent electrodes and aligning films and a L.C. composition, with a positive dielectric anisotropy, positioned in a layer between the substrates, long axes of the L.C. molecules are aligned nearly homogeneous to a plane parallel to the substrate in the absence of an applied field and the molecules are twisted in an angle of 120° to 360° in a direction perpendicular to the substrate;

(b) a pair of polarizers are positioned on opposite sides of the cell; and (c) one or more birefringent layers are positioned between the cell and at least one of the polarizers, a maximum refractive index direction at a plane of a layer contacting the polarizer and the maximum refractive index direction at a plane of a layer contacting the L.C. cell are tilted with respect to the substrate and angles made by the both maximum refractive index directions and with respect to the substrate are symmetrically aligned with each other.

BRIEF EXPLANATION OF THE DRAWINGS

FIGS. 4 and 5 are schematic diagrams of two representative birefringent layers of the present invention. The figures show a tilt angle $\alpha$ made between a maximum refractive index direction a and a plane parallel to the substrate, a direction b which is in a plane parallel to the substrate and perpendicular to the direction a and a direction c perpendicular to the directions a and b.

FIG. 6 explains definitions of several angles involved in the present invention. Each of $D_1$ and $D_2$ is a projected direction of molecules on a plane of the L.C. layer contacting the substrates 1 and 11, respectively, on a lower substrate 11. $\omega_1$ is a twisted angle of L.C. molecules between $D_1$ and $D_2$. X is a projected direction of maximum refractive index directions $a_1$ and $a_2$ at the planes, contacting to a polarizer and to a L.C. cell, respectively, of the birefringent layers all on a plane parallel to the substrate. Since these directions $a_1$ and $a_2$ are on a same plane perpendicular to the substrate, $a_1$ and $a_2$ are projected on one straight line. $P_1$ and $P_2$ are the projected axes of transmission of polarizers 2 and 12 contacting, respectively, to the birefringent layer and the substrate, on a plane parallel to the substrate 11.

In the present inventions, a term "a viewing angle", means an angle made between an eye direction and a perpendicular at a given point on the display surface.

Numerical figures attached to the drawings are:
1: Upper Substrate
2: Upper Polarizer
3: Upper Aligning Film
4: Upper Transparent Electrode
5: Sealing Material
6: Liquid Crystal
7: Birefringent Layer
8: Birefringent Layer (only in FIG. 2)
10: STN Cell
11: Lower Substrate
12: Lower Polarizer 13: Lower Aligning Film
14: Lower Transparent Electrode

SUMMARY OF THE INVENTION

An object of the present invention is to provide a L.C. display device with high contrast whose properties are less dependent on a viewing angle.

Another object of the present invention is to provide the L.C. display device which comprises (1) a L.C. cell comprising a pair of substrates having transparent electrodes, and a L.C. composition with a positive dielectric anisotropy positioned between the substrates, long axes of the L.C. molecules being aligned nearly homogeneous in a plane parallel to the substrate when there is no applied field and the molecules being twisted by an angle of 120° to 360° in a direction perpendicular to the substrate; (2) a pair of polarizers positioned on opposite sides of the cell; and (3) one or more birefringent layers positioned between the cell and at least one of the polarizers.

In the present invention, the term "L.C. composition" means a mixture of a L.C. and other L.C. and/or a substance other than a L.C., such as a chiral substance, still exhibiting a L.C. phase. Further, the term "long axes of L.C. molecules are aligned nearly homogeneous in a plane", used in the present invention, means pretilt angle of long axes of the molecules to the plane is in a range of 0° to 30°.

A further object of the present invention is to provide the L.C. display device in which an angle made between a maximum refractive index direction at a plane of the birefringent layer contacting the polarizer and a plane parallel to the substrate, and an angle between the maximum refractive index direction and a plane, contacting the L.C. cell, of the birefringent layer contacting the L.C. cell are aligned symmetrically with regards to the plane parallel to the substrate.

Another object of the present invention is to provide the L.C. display device in which angles made between maximum refractive index directions relative to a plane parallel to the substrate of the birefringent layer are distributed continuously in a line perpendicular to the substrate.

Furthermore, an object of the present invention is to provide the L.C. display device in which said birefringent layer is consisting of two birefringent layers stuck together.

DETAILED DESCRIPTION OF THE INVENTION

Hereinafter, a composition of the present invention is described in detail based on the drawings attached.

Figure 1:
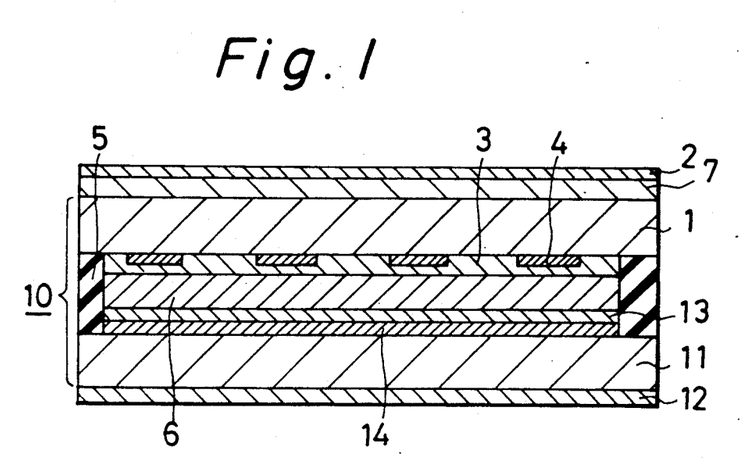
FIGS. 1 and 2 are cross-sectional drawings representing two representative examples of the L.C. display device of the present invention.
Figure 2:
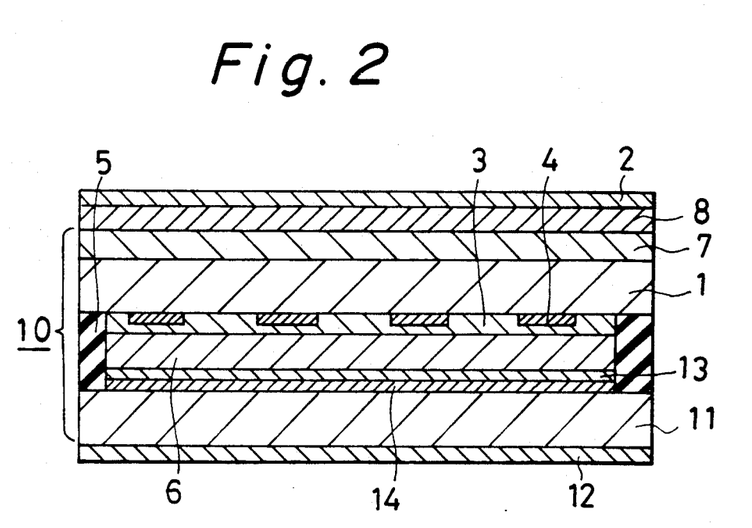

FIGS. 1 and 2 are cross-sectional drawings showing representative, compositional examples of L.C. display devices of the present invention.

Figure 4:
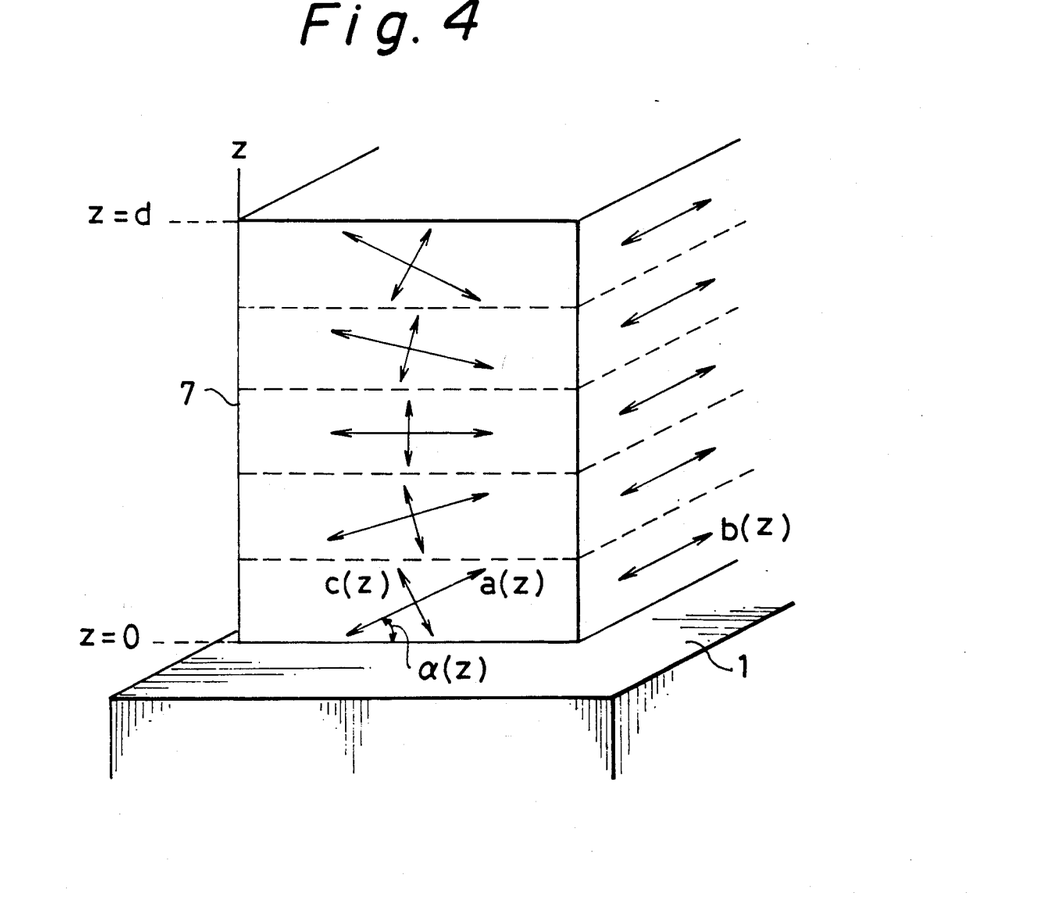

In these drawings, 10 is a STN cell, in which a pair of substrates 1 and 11, each provided with aligning film 3 or 13 or transparent electrode 4 or 14, are positioned face to face with a certain space between them. L.C. 6 is put into the space surrounded by the substrates and sealing materials 5 and sealed in the space shut up from outside atmosphere and makes up a L.C. cell. Polarizers 2 and 12 are located on opposing sides of the L.C. cell and a birefringent layer is disposed between the substrate 1 and the polarizer 2. In the birefringent layer 7 of the device shown in FIG. 1, the maximum refractive index directions have tilt angles to a plane parallel to the substrate, the tilt angles are continuously distributed with respect to a direction perpendicular to the substrate, the tilt angle at a plane of the birefringent layer contacting the polarizer 2 and the tilt angle at a plane of the layer contacting the cell 10 are arranged to be symmetric to one another with regard to a plane parallel to the substrate. This birefringent layer 7 is shown in FIG. 4 in more detail.

Figure 5:
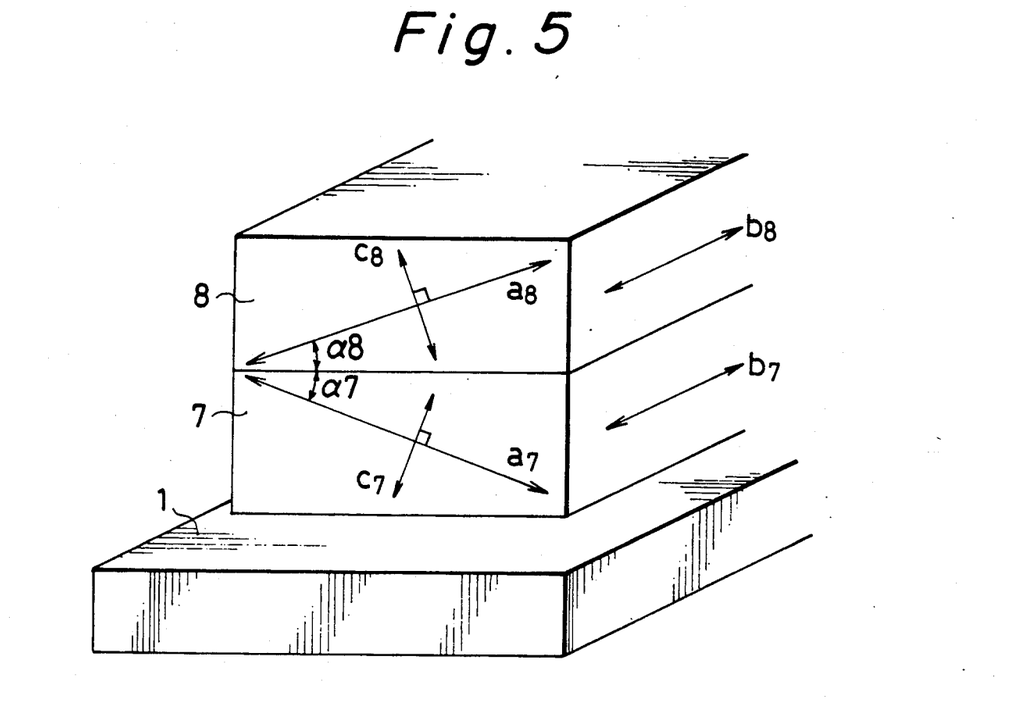

The device shown in FIG. 2 has birefringent layers consisting of two superposed birefringent layers 7 and 8 and each maximum refractive index direction of the layers forms an angle with a plane parallel to the substrate and the angles are symmetrical to one another with respect to the plane. The two birefringent layers 7 and 8 are shown in FIG. 5 more in detail.

The device of the present invention can b used as a reflecting type device by placing a reflecting plate on an outer surface of a polarizer placed opposite to the side of the device through which incident light enters. As an another compositional example of the device, the substrate can have a birefringent function. In this case, the layer composition of the device is based on the conventional STN type L.C. display device, but at least one of the substrates 1 and 11 also has a birefringent function. Still another compositional example of the device, the polarizer itself also works as a birefringent layer.

Generally, a polarizer utilizing a dichroism of iodine or a dyestuff is prepared by attaching iodine or the dyestuff on an axially oriented film to make the film polarizable and sandwiching the oriented film with two protecting films. In this case, the birefringent layer can be disposed between one of said protecting films which is on L.C. cell side, and said oriented film. Further, the birefringent layer can be used as the protecting film on the cell side. As described above, the birefringent layer of the present invention can be disposed any place between the L.C. cell and the polarizer.

When the birefringent layer is disposed between the substrate and the polarizer of a device of the present invention, a transparent glass plate or plastic sheet can be used as the substrate. When a plastic substrate is used, since it is easy to have the substrate having a thickness of not thicker than 0.2 mm, the device can be quite thin and also light in weight. Further, as the substrates are thin, the device without any double image on display surface and having a wide viewing angle is obtainable.

An aligning film on each of the substrates of the device according to the present invention is prepared so as to make L.C. molecules aligned nearly homogeneous in a plane parallel to the substrate and at least a majority of the molecules are aligned along the treated direction. The term "L.C. molecules are aligned nearly homogeneous to a plane parallel to the substrate" in the present invention means "pretilt angle of the L.C. molecules to a plain parallel to the substrate is in a range of 0° to 30°". This treatment can be performed on the substrate by an oblique vapor deposition or by rubbing with a cotton cloth after making an inorganic or organic film coating the substrate to an aligning film, of which treatment are already known. An aligning films, 3 and 13, of the present invention, rubbing-treated coating film of polymer such as polyamide or polyimide, or an obliquely vapor deposited film with SiO, MgO, $MgF_2$, etc. can be used.

Figure 3:
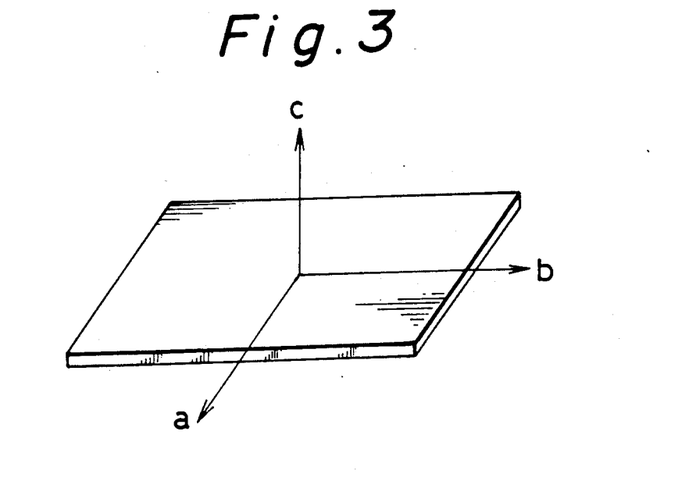
FIG. 3 shows three refractive index directions, i.e., a maximum refractive index direction a in a plane parallel to the substrate, a direction b in the plane orthogonal to a and a direction c perpendicular to the substrate, in a birefringent layer widely used in general.

In general, a birefringent layer is characterized by refractive index of three directions a, b and c, namely, refractive index $n_a$ of direction a, which is a maximum refractive index direction [in a plain parallel to the substrate], refractive index $n_b$ of direction b which is in the plane and is orthogonal to a and refractive index $n_c$ of direction c perpendicular to the substrate, as is shown in FIG. 3.

FIGS. 4 and 5 are schematic diagrams explaining more in detail the birefringent layers used in the devices shown in FIGS. 1 and 2. In a birefringent layer 7, as is shown in FIG. 4, maximum refractive index directions at planes of both sides of the layer 7 form angles with the substrate and both angles are arranged to be symmetric to one another with regard to a plane parallel to the substrate. Further, tilt angles formed by maximum refractive index directions of respective planes between both sides of the layer and parallel to the substrate are distributed continuously along the direction perpendicular to the substrate.

When a distance of the direction of the layer 7 from the substrate is defined as z (at a plane contacting the substrate, z=0 and at a plane contacting the polarizer z=d), a maximum refractive index direction a at each plane which is parallel to the substrate, of the birefringent layer 7 is expressed as a(z), a function of z, a direction b, which is in a plane parallel to the substrate and is perpendicular to the direction a, as b(z), a direction c perpendicular to both directions a and b as c(z), an angle α formed between each direction z(a) and a plane parallel to the substrate as α(z), and refractive indexes of the directions a(z), b(z) and c(z) are independent upon z and have constant values within a range from z=0 to z=d. The respective index is expressed as $n_a$, $n_b$ and $n_c$. Further, because maximum refractive index directions at both sides of the birefringent layer 7 are symmetrical with regards to a pan parallel to the substrate, that is α(d) is equal to −α(O).

Formation of the birefringent layer described above may include treatment of a L.C. cell to align its molecules. Alternatively, a plastic film may be treated thermally or mechanically on both sides to orient crystals on the sides.

In FIG. 5, each maximum refractive index direction of superposed birefringent layers 7 and 8 forms an angle with a plane parallel to the substrate to and the angles are symmetric, one another relative to a plane parallel to the substrate. In birefringent layer 7, $n_{a7}$ is a refractive index in a maximum refractive index direction $a_7$; $n_{b7}$ is in a plane parallel to the substrate and is perpendicular to the direction $a_7$; $n_{c7}$ is the index in a direction $c_7$ perpendicular to the directions $a_7$ and $b_7$; and $α_7$ is an angle formed by the direction $a_7$ and a plane parallel to the substrate. $n_{a8}$, $n_{b8}$, $n_{c8}$, $a_8$, $b_8$, $c_8$ and $α_8$ have the same meanings as above but in the birefringent layer 8.

Since tilt angles respectively formed by the maximum refractive index directions $a_7$ and $a_8$, are symmetric with one another with regard to a plane parallel to the substrate, the absolute values of $α_7$ and $α_8$ are equal. Examples of the birefringent layers described above include: superposed two L.C. cells of which L.C. molecules or polymer L.C. molecules are obliquely aligned; two plastic films thermally or mechanically treated and laminated; and micas or crystals cut along surfaces which are oblique to a light axis and laminated.

Figure 6:
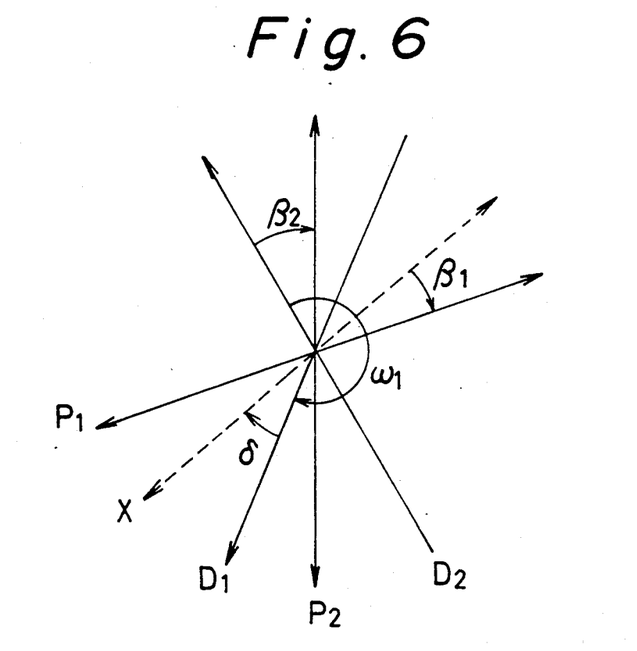

FIG. 6 shows definitions of the angles involved in the present invention. $D_1$ and $D_2$ are respectively the direction along which L.C. molecules on planes respectively contacting the first upper and second lower substrates 1 and 11 and projected on the lower substrate 11, and arrows on lines $D_1$ and $D_2$ mean directions along which L.C. molecules on the planes point, which are slightly upward to a plane parallel to the substrate 11. The L.C. cell has a structure that L.C. molecules are twisted by an angle $ω_1$ between $D_1$ and $D_2$.

As a L.C. in the cell 10, a nematic L.C. with positive anisotropy adjusted to an appropriate pitch by adding a chiral substance is preferably used. When $ω_1$ is small, a steepness is worsened and a time-driven property is lowered. On the other hand, when $ω_1$ is too large, a display quality is lowered because certain diffusion parts are generated when a field is applied. Judging from these facts, it is necessary to make $ω_1$ in a range of 120° to 360°. In FIG. 6, when the L.C. cell is viewed from a side of the substrate 1, a direction of the twist from the substrate 11 to the substrate 1 is adjusted to be clockwise. However, it can be adjusted to be anticlockwise by controlling an aligned direction or by selecting a cholesteric L.C. or a chiral nematic L.C. as a chiral substance.

As respective directions a(z) in FIG. 4 or directions $a_7$ and $a_8$ in FIG. 5 are on a same plane perpendicular to the respective substrate, when these directions are projected on a plane parallel to the respective substrate they are on one straight line. A direction of this straight line is called direction x. The direction x forms an angle θ with the direction $D_1$ which is an aligned direction of L.C. molecules on the substrate 1. A transmission axis $P_1$ of the polarizer adjacent to a birefringent layer forms an angle $β_1$ relative to the direction x. Further, a transmission axis $P_2$ of the polarizer 12 forms an angle $β_2$ relative to the direction $D_2$. These angles are measured deeming a twisted direction of L.C. molecules as positive.

When a birefringent layer and a polarizer are superposed, a color is generated on the display surface. An intensity of the color is a function of a retardation of the birefringent layer and a polarizing direction of the polarizer. The colors from various viewing directions vary depending upon a viewing angle dependency of retardation of the birefringent layer. When the viewing angle dependency upon retardation of the birefringent layer is small, a viewing angle dependency upon the color also becomes small. Accordingly, when a viewing angle dependency upon a retardation of birefringent layer applied as a means for compensating color of STN L.C. display device is small, a viewing angle dependency of color on the display becomes small.

Figure 7:
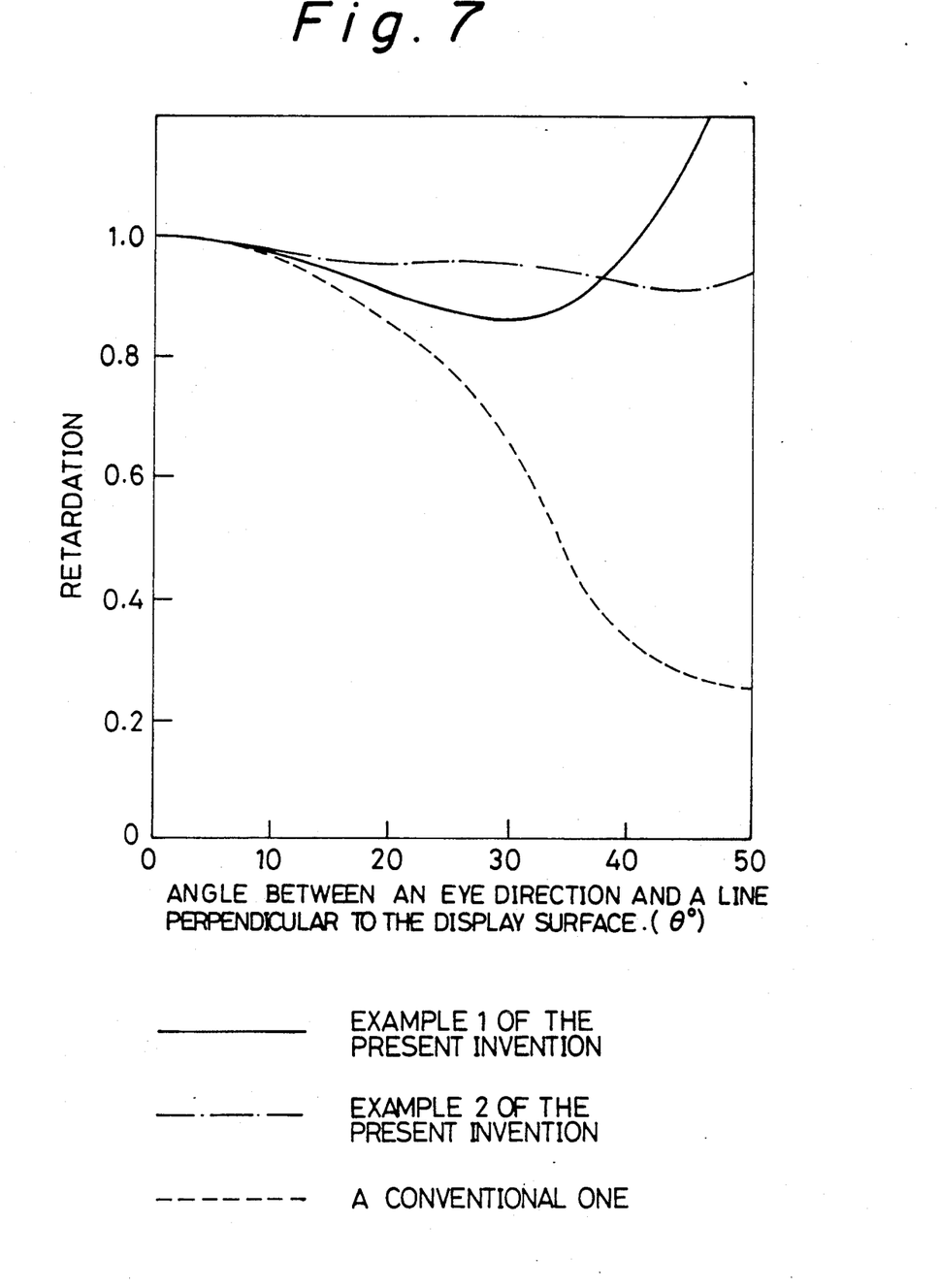
FIG. 7 presents a viewing angle dependency on retardations of display devices using birefringent layers described in Examples 1 and 2 of the present invention and a conventional birefringent layer.

FIG. 7 shows examples of a viewing angle dependency on retardation of a conventional birefringent layer and the layer of the present invention. The retardation is the one when a birefringent layer is seen from a direction perpendicular to the layer and is normalized. The viewing angle θ is an angle formed between a viewing direction and a direction perpendicular to the birefringent layer in a plane involving a maximum refractive index direction in the layer and being perpendicular to the layer. Refractive indexes of the conventional birefringent layer are $n_1=1.6$, $n_b=1.5$ and $n_c=1.45$. The indexes of birefringent layer of the present invention shown in FIG. 4 are $n_{az}=1.6$, $n_{bz}=1.5$, $n_{cz}=1.45$ and α(0)=30° and those shown in FIG. 5 are $n_{a7}=n_{b8}=1.5$, $n_{b7}=n_{b8}=1.5$, $n_{c7}=n_{c8}=1.45$ and $α_7=α_8=25°$.

As is clearly seen in FIG. 7, even the viewing angle dependency on retardation of birefringent layer composed as shown in FIG. 5 is smaller than that of the conventional layer. Therefore, the L.C. display device of the present invention has a smaller viewing angle dependency of color and accordingly better viewing property than a conventional display device.

The term "plane" in the present invention means a two-dimensional plane having no thickness and the sentence "planes between plan A and plane B" means planes existing between plane A and plane B but not including plains A and B.

EXAMPLES

Hereinafter, several Examples are described to explain the device of the present invention more concretely, but the scope of the present invention is not limited by these Examples.

EXAMPLE 1

A STN cell with transparent electrodes, having a twisted angle $\omega_1$ of the L.C. molecules between upper and lower substrates being 200° and a retardation of the L.C. cell being 0.92 μm, was prepared.

The L.C. was a nematic L.C. with positive anysotropy (ZLI 2293, manufactured by E. Merck) and 0.65% of a chiral nematic L.C. (S 811, manufactured by Merck and Co.) was added. By rubbing-treating an aligning film on the substrate, which composed polyimide film, an aligning treatment was carried out.

For a birefringent layer, (i) two L.C. cells having homogeneously aligned L.C. molecules between upper and lower substrates (glass plates) were prepared; (ii) an aligning treatment on the cells by an oblique vapor deposition of SiO was carried out to make pretilt angle of a major axis direction of the L.C. molecules ($a_7$ or $a_8$ in FIG. 5) relative to the substrate to be about 30°; and (iii) the two cells thus treated are superposed as shown in FIG. 5. The superposed cells were placed between upper substrate 1 and upper polarizer 2 adjusting a direction x of the layer is orthogonal to an aligned direction $D_1$ of L.C. molecules on the substrate 1 ($\delta=90°$).

Retardation of the cells with homogeneously aligned L.C. molecules were 0.417 μm on each of the cells. L.C. used in the cells was ZLI2293.

A neutral gray polarizer 12 was placed at a lower side of the STN cell and arranged to make its light transmission axis forms an angle, $\beta_2$, of 45° with L.C. molecules aligned direction on a plain contacting the lower substrate 11.

Further, at a lower side of the polarizer 12, a backlight using a cold cathode ray tube was placed. At an upper side of the birefringent layer 8 disposed on the upper side of the STN cell, a neutral gray polarizer 2 was placed, and made its light transmission axis to form an angle, $\beta_1$, of −45° with a direction x of the birefringent layer.

It was confirmed that a display area of the thus composed L.C. display device (i) was black when a voltage was off and white when a voltage was on, (ii) had little color change due to a viewing angle direction, and (iii) had an excellent viewing angle property.

EXAMPLE 2

In the same manner as in Example 1, a STN cell was prepared.

As a birefringent layer, a L.C. cell being sandwiched by upper and lower substrates (glass plates) was prepared. Each of the substrates was treated by an oblique vapor deposition of SiO to make a major axis of L.C. molecules on a plane contacting to each substrate have a pretilt angle of about 30° relative to the substrate.

Further, in the birefringent layer, major axes of L.C. molecules on planes between the planes of the L.C. layer contacting respective substrates are continuously aligned along the direction perpendicular to the substrate as his shown in FIG. 4. This L.C. cell is, hereinafter, called as "Cell I".

The Cell I is placed between the upper substrate 1 and the upper polarizer 2 adjusting a direction x of the Cell I to be orthogonal to an aligned direction ($D_1$) of L.C. molecules of the STN cell on a plain contacting the upper substrate 1 ($\delta=90°$). A retardation of Cell I in a direction perpendicular to the substrate was 0.834 μm and the L.C. used in the Cell I was ZLI2293.

On the other hand, a neutral gray polarizer 12 was placed at a lower side of the STN cell and arranged to make its light transmission axis forms an angle of 45° ($\beta_2=45°$) with an aligned direction of the L.C. molecules on a plane contacting the lower substrate 11. At the lower side of the lower polarizer 12, a backlight using a cold cathode ray tube was placed. In the meanwhile, at an upper side of the birefringent layer 7 disposed on an upper side of Cell I, a neutral gray polarizer 2 was placed arranging its light transmission axis to form an angle of −45° ($\beta_1=-45°$) with a direction x of Cell I.

It was confirmed that a display area of the thus composed L.C. display device (i) was black when a voltage was off and white when a voltage was on, (ii) had little color change due to a viewing angles direction, and (iii) had an excellent viewing angle property.

EXAMPLE 3

In the same manner as in Example 1, a STN cell was prepared.

As a birefringent layer, two L.C. cells, each of which was prepared by forming a polymer L.C. layer on a set of glass plates (substrates), were superposed. The aligning treatment of these set of glass plates were carried out by an oblique vapor deposition of SiO and a pretilt angle of a major axis direction of the L.C. molecules of respective cells ($a_7$ and $a_8$ directions in FIG. 5) to a plane parallel to the substrate was arranged to be about 30° and the two cells were superposed as shown in FIG. 5.

Retardations of these L.C. cells in a direction perpendicular to these glass substrates were 0.417 μm for each of the both cells. As the polymer L.C., the one having straight chain molecules was used.

This birefringent layer composed of two polymer L.C. cells was placed between upper substrate 1 and upper polarizer 2 adjusting a direction x of the layer to be orthogonal to an aligned direction $D_1$ of L.C. molecules on a plane contacting the upper substrate 1 ($\delta=90°$), and upper and lower polarizers were placed to make $\beta_1=-45°$ and $\beta_2=45°$. Further, at a lower side of the lower polarizer 12, a backlight using a cold cathode ray tube was set.

It was confirmed that a display area of the thus composed L.C. display device (i) was black when a voltage was off and white when a voltage was on, (ii) had little color change due to a viewing angle direction, and (iii) had an excellent viewing angle property.

EXAMPLE 4

A STN cell having transparent electrodes and L.C. cells sandwiched by upper and lower substrates made of glass plates was prepared. A twisted angle, $\omega_1$ of L.C. molecules between the substrates was 240° and a retardation of L.C. layers was 1.0 μm. The L.C. used was a nematic L.C. ZLI 2293 mixed with 0.6% of a chiral nematic L.C. S 811. An aligning treatment was performed by a rubbing treatment on aligning films which were polyimide film.

One surface of a casted plastic film was thermally treated by a hot role and subsequently the other surface was treated in the same manner, so that major axes of molecules on both surfaces of the plastic film were aligned obliquely to a plane parallel to the surface and both axes were aligned to be symmetric with one another relative to the film surface. The thermally treated polymer film was placed on the STN cell as a birefringent layer to have an angle, $\delta$, of 90°. The angle on a plane parallel to the surface and contacting the upper substrate, $\alpha(0)$, made between the major axes and the surface was about 25°. A retardation of the birefringent layer in a direction perpendicular to a surface of the plastic film was arranged to be 0.94 μm by adjusting the thickness and the thermal treating conditions of the plastic film.

At a lower side of the STN cell, a neutral gray polarizer with a reflecting plate was placed to have an angle, $\beta_2$, of 45°. Also, a neutral gray polarizer was placed on upper side of the birefringent layer and made $\beta_1 = -45°$.

It was also confirmed that a display area of the thus composed L.C. display device (i) was black when a voltage was off and white when a voltage was on, (ii) had little color change due to a viewing angle direction, and (iii) had an excellent viewing angle property.

EXAMPLE 5

In the same manner as in Example 4, a STN cell having a twisted angle, $\omega_1$, of 240 was prepared.

To prepare a birefringent layer, each one surface of casted two plastic films was respectively thermally treated by a hot role, a major axis of molecules in each film was obliquely aligned, two films were superposed as is shown in FIG. 5, and the birefringent layer of the present invention was prepared.

An angle formed between a major axis of molecules of the film and the surface of the film ($\alpha_7$ and $\alpha_8$ in FIG. 5) was about 25°, and the treating conditions and a thickness of the films are arranged to make a retardation of the layer in a direction perpendicular to the surface of the film was 0.47 μm for each of the films and in total 0.94 μm. The birefringent layer was placed on the STN cell to have an angle, $\delta$, of 90°.

On the other hand, a neutral gray polarizer with a reflecting plate was placed at a lower side of the STN cell to have an angle, $\beta_2$, of 45°. Also, a neutral gray polarizer was placed on a upper side of the birefringent layer and made $\beta_1 = -45°$.

It was also confirmed that a display area of the thus composed L.C. display device (i) was black when a voltage was off and white when a voltage was on, (ii) had little color change due to a viewing angle direction, and (iii) had an excellent viewing angle property.

What is claimed is:

1. A liquid crystal display device comprising:
   (a) a liquid crystal cell including a pair of substrates, each substrate having at least one transparent electrode and at least one aligning film, and a liquid crystal composition layer, having a positive dielectric anisotropy, positioned between the substrates, long axes of the liquid crystal molecules being aligned nearly homogeneously in a plane parallel to the substrate in the absence of an applied field and the molecules being twisted in an angle of 120° to 360° in a direction perpendicular to the substrate;
   (b) a pair of polarizers positioned on opposite sides of the cell; and
   (c) a first birefringent layer positioned between the cell and a first one of the polarizers, wherein said first birefringent layer has a first maximum refractive index direction at a first plane contacting the polarizer, and a second maximum refractive index direction at a second plane contacting the liquid crystal cell, the first and second directions are tilted relative to a plane parallel to one of the substrates, angles made between each of the first and second directions and the parallel plane are aligned symmetrically about the parallel plane, and angles made between the parallel plane and the maximum refractive index directions in the first birefringent layer vary continuously along the direction perpendicular to one of the substrates.

2. The device according to claim 1, wherein said birefringent layer comprises a liquid crystal cell.

3. The device according to claim 1, wherein said birefringent layer comprises a plastic film treated, on both sides, to align its molecules.

4. The device according to claim 1, wherein absolute values of retardation of a part of the first birefringent layer near a first one of said pair of polarizers and a part of the first birefringent layer near the cell are equal when both parts are at an equal distance from a plane at which the maximum refractive index direction is parallel to one of the substrates.

5. A liquid crystal display device comprising:
   (a) a liquid crystal cell comprising a pair of substrates, each of which has at least one transparent electrode, at least one aligning film, and a liquid crystal composition layer having a positive dielectric anisotropy and positioned between the substrates, long axes of the liquid crystal molecules being aligned nearly homogeneously in a plane parallel to one of the substrates in the absence of an applied field and the molecules being twisted in an angle of 120° to 360° in a direction perpendicular to one of the substrates;
   (b) a pair of polarizers positioned on opposite sides of the cell; and
   (c) a first set of two birefringent layers stuck together and positioned between the cell and a first one of the pair of polarizers, wherein said first set of two birefringent layers has a first maximum refractive index direction of the birefringent layer contacting the polarizer and a second maximum refractive index direction of the birefringent layer contacting the liquid crystal cell, the first and second directions are tilted relative to a plane parallel to one of the substrates and angles made between each of the first and second directions and the parallel plane are aligned symmetrically about the plane.

6. The device according to claim 5, wherein said two birefringent layers comprise two liquid crystal cells.

7. The device according to claim 5, wherein said two birefringent layers comprise two plastic films, each of the plastic films being treated on one side to align its molecules and the treated films being laminated, on the untreated sides, the treated sides being outer surfaces.

8. The device according to claim 5, wherein absolute values of retardation of said two birefringent layers are equal.

9. The device according to claim 1 or 5, wherein a pretilt angle of long axes of the liquid crystal molecules is in a range of 0° to 30°.

10. The device according to claim 1 or 5, wherein said birefringent layers each comprise a polymer liquid crystal film.

11. The device according to claim 1 or 5, wherein at least one of said substrates also serves as the aligning film.

12. A liquid crystal display device, comprising:
(a) a liquid crystal cell comprising a substrate having at least one transparent electrode, at least one aligning film and a liquid crystal composition layer having a positive dielectric anisotropy and positioned between the substrate and a birefringent layer, long axes of the liquid crystal molecules being aligned nearly homogeneously in a plane parallel to the substrate in the absence of an applied field and the molecules being twisted in an angle of 120° to 360° in a direction perpendicular to the substrate;
(b) a pair of polarizers positioned on opposite sides of the cell; and
(c) the birefringent layer, positioned between the liquid crystal composition layer and a first one of the pair of polarizers, wherein said birefringent layer has a first maximum refractive index direction at a first plane contacting the polarizer, and a second maximum refractive index direction at a second plane contacting the liquid crystal composition layer, the first and second directions are tilted relative to a lane parallel to the substrate, angles made between each of the first and second directions and the parallel plane are aligned symmetrically about the parallel plane and angles made between the parallel plane and the maximum refractive index directions in the birefringent layer vary continuously along the direction perpendicular to the substrate; and
at least one transparent electrode and at least one aligning film are disposed on the birefringent layer.

13. A liquid crystal display device, comprising:
(a) a liquid crystal cell comprising a substrate having at least one transparent electrode, at least one aligning film, and a liquid crystal composition layer having a positive dielectric anisotropy and positioned between the substrate and first and second birefringent layers, long axes of the liquid crystal molecules being aligned nearly homogeneously in a plane parallel to the substrate in the absence of an applied field and the molecules being twisted in an angle of 120° to 360° in a direction perpendicular to the substrate;
(b) a pair of polarizers positioned on opposite sides of the cell; and
(c) the first and second birefringent layers are stuck together and positioned between the liquid crystal composition layer and a first one of the pair of polarizers, wherein the first birefringent layer is disposed between the second birefringent layer and the liquid crystal composition, the second birefringent layer is disposed between the first birefringent layer and one of the pair of polarizers, the first birefringent layer has a first maximum refractive index direction and the second birefringent layer has a second maximum refractive index direction, the first and second directions are tilted relative to a plane parallel to the substrate, angles made between each of the first and second directions and the parallel plane are aligned symmetrically about the parallel plane and at least one transparent electrode and at least one aligning film are disposed on the first birefringent layer.

14. A liquid crystal display device, comprising:
(a) a liquid crystal cell comprising a pair of substrates, each of which has at least one transparent electrode, at least one aligning film, and a liquid crystal composition layer having a positive dielectric anisotropy which is positioned between the substrates, long axes of the liquid crystal molecules are aligned nearly homogeneously in a plane parallel to one of the substrates in the absence of an applied field and the molecules are twisted in an angle of 120° to 360° in a direction perpendicular to said one of the substrates;
(b) a polarizer positioned on one side of the cell and a birefringent layer disposed on an opposite side of the cell from said polarizer; and
(c) the birefringent layer has opposing first and second major surfaces, the second major surface contacts the cell, said birefringent layer has a first maximum refractive index direction at the first surface contacting the polarizer and a second maximum refractive index direction at the second surface contacting the liquid crystal cell, the first and second directions are tilted relative to a plane parallel to said one of the substrates, angles made between the first and second directions and the parallel plane are aligned symmetrically about the parallel plane, angles made between the parallel plane and the maximum refractive index directions in the birefringent layer vary continuously along the direction perpendicular to the substrate, wherein the birefringent layer polarizes light passing therethrough.

15. A liquid crystal display device, comprising:
(a) a liquid crystal cell comprising a pair of substrates, each of which has at least one transparent electrode, at least one aligning film and a liquid crystal composition layer having a positive dielectric anisotropy which is positioned between the substrates, long axes of the liquid crystal molecules being aligned nearly homogeneously in a plane parallel to one of the substrates in the absence of an applied field and the molecules being twisted in an angle of 120° to 360° in a direction perpendicular to said one of the substrates;
(b) a polarizer positioned on one side of the cell and first and second birefringent layers disposed at an opposite side of the cell from said polarizer; and
(c) first and second birefringent layers are stuck together and positioned on the side of the cell opposite to the polarizer, wherein the first birefringent layer has a first maximum refractive index direction and the second birefringent layer has a second maximum refractive index direction, the first and second directions are tilted relative to a plane parallel to said one of the substrates and angles made between the first and second directions and the parallel plane are aligned symmetrically about the parallel plane, wherein the first birefringent layer polarizes light passing therethrough.

* * * * *